United States Patent [19]

Ohmura et al.

[11] Patent Number: 4,995,321
[45] Date of Patent: Feb. 26, 1991

[54] CAR BODY FOR RAILWAY ROLLING STOCK

[75] Inventors: Keiji Ohmura; Sumio Okuno; Michifumi Takeichi; Masato Okazaki; Hitoshi Tsuruda, all of Kudamatsu, Japan

[73] Assignee: Hitachi, Ltd., Tokyo, Japan

[21] Appl. No.: 365,439

[22] Filed: Jun. 13, 1989

[30] Foreign Application Priority Data

Jun. 13, 1988 [JP] Japan .................................. 63-143730

[51] Int. Cl.⁵ ........................ B61D 17/04; B61D 25/00
[52] U.S. Cl. ..................................... 105/397; 105/396
[58] Field of Search ............... 105/396, 397, 399, 401, 105/404, 407, 410, 411

[56] References Cited

U.S. PATENT DOCUMENTS

| | | | |
|---|---|---|---|
| 2,024,342 | 12/1935 | Dietrichson | 105/401 X |
| 2,244,661 | 6/1941 | Christianson | 105/401 X |
| 2,256,493 | 9/1941 | Ragsdale et al. | 105/399 X |
| 2,595,212 | 4/1952 | Ledwinka et al. | 105/401 |
| 2,619,045 | 11/1952 | Dean | 105/399 |

FOREIGN PATENT DOCUMENTS

205872 12/1967 U.S.S.R. .

Primary Examiner—Robert P. Olszewski
Assistant Examiner—A. Muratori
Attorney, Agent, or Firm—Antonelli, Terry, Stout & Kraus

[57] ABSTRACT

A light weight car body for railway rolling stock wherein the shearing rigidity with respect to a vertical load in a portion near a body bolster of the car body is larger than the shearing rigidity of a portion other than the portion near the body bolster whereby the shearing rigidity of the portion other than the portion near the body bolster of the car body has a sufficient bending rigidity.

13 Claims, 8 Drawing Sheets

CAR BODY FOR RAILWAY ROLLING STOCK

BACKGROUND OF THE INVENTION

1. Field of the Invention This invention relates to a car body for railway rolling stock and, more particularly, a car body for high speed railway rolling stock.

A car body of the aforementioned type for railway rolling stock is described, for example, in pages 15-79 and 15-80 of a revised edition NO. 6 (1977) of the Handbook of Mechanical Engineering, wherein an underframe, a side construction, a roof construction and an end construction of the car body are assembled and combined with each other to form a car body. A load acting on the car body is supported by the underframe, side construction, roof construction and end construction, and the side construction is connected at its lower end to the underframe and at its upper end to the roof construction, respectively. Accordingly, the side construction described above may support almost of all the bending load acting against the car body, for example, a vertical load of a self-weight and passenger weight and a bending load generated by an end load of the car body.

In recent years, it is strongly requested to have a light weight car body in order to make a high speed railway rolling stock and to reduce power consumption. Additionally, to reduce the amount of labor required in manufacturing car bodies and also to reduce the required period of time for manufacturing the car body, it has been desirable to improve the car body construction as well as the manufacturing process of the car body.

A light-weight car body, is described on page 38 of Car Body Engineering No.176 (1986), wherein the car body is manufactured by a large-sized extruded member of aluminum, with each of the side construction, underframe and roof construction constituting the car body being connected by a plurality of extruded members longitudinally guided in the car body and connected to each other through a welding process. Accordingly, the number of component parts constituting the car body can be substantially decreased, and, it is also possible to reduce the labor and time required in the manufacturing operation of the car body. In this case, a specification of an outside plate and frame member which may act to form the car body is determined with reference to or dependence upon a load acting against the frame. In, for example, Railway Vehicle and Design Engineering, Ohkawa Publishing, 1980, pages 57-61, a calculation program through a finite element method is utilized to analyze a construction of a car body and to calculate a deformation of the car body or stress thereof. Then, a plate thickness and a shape of the outside plate and a frame member are determined in response to a stress acting on each of the portions in the car body. Additionally, the specification of the outside plate and frame member is generally preferably standardized as much as possible so as to reduce the number of types of outside plate and frame members required to manufacture the car body. A construction of each of the portions of the car body is determined in view of a bending stiffness of an entire car body which may substantially influence a riding comfort of the car. Further, a specification of each of the portions for constructing the car body is also determined with a view toward the bending stiffness of the entire car body.

In the prior art, the bending load acting against the car body has been the most substantiated in order to assure the bending stiffness of the entire car body. The entire car body has been constructed so as to have a substantially uniform bending stiffness by providing a common specification for the outside plate and frame member forming the car body.

In the prior art, a high shearing load is provided at the part where a body bolster for transmitting the entire load of the car body to a truck of the rolling stock is mounted. However, insufficient consideration has been given to the shearing load acting near the body bolster. For example, in the prior art, as a countermeasure a reinforcing member is partially mounted in order to prevent a buckling of the outside plate and a concentration of stress at the corners of a window frame generated under the shearing load. Thus, the construction of the outside plate and frame member of the car body or the structure of each of the portions of the car body has not been sufficiently determined in view of the shearing load. That is, a high shearing load acts near the body bolster and a high bending load may act at the central part of the car body. However, the structure of the prior art car body does not sufficiently support the shearing load and the bending load and does not have a light weight construction. Accordingly, the car body structure of the prior art does not necessarily provide an effective structure for improving the light weight construction of the car body.

SUMMARY OF THE INVENTION

Accordingly, it is an object of the present invention to provide a light weight car body for railway rolling stock.

Another object of the present invention resides in providing a light weight car body for railway rolling stock in which a shearing load and a bending load acting against the car body can be efficiently supported.

Yet another object of the present invention resides in providing alight weight car body of railway rolling stock which may be easily manufactured.

DESCRIPTION OF PREFERRED EMBODIMENTS

Figures 1, 2:
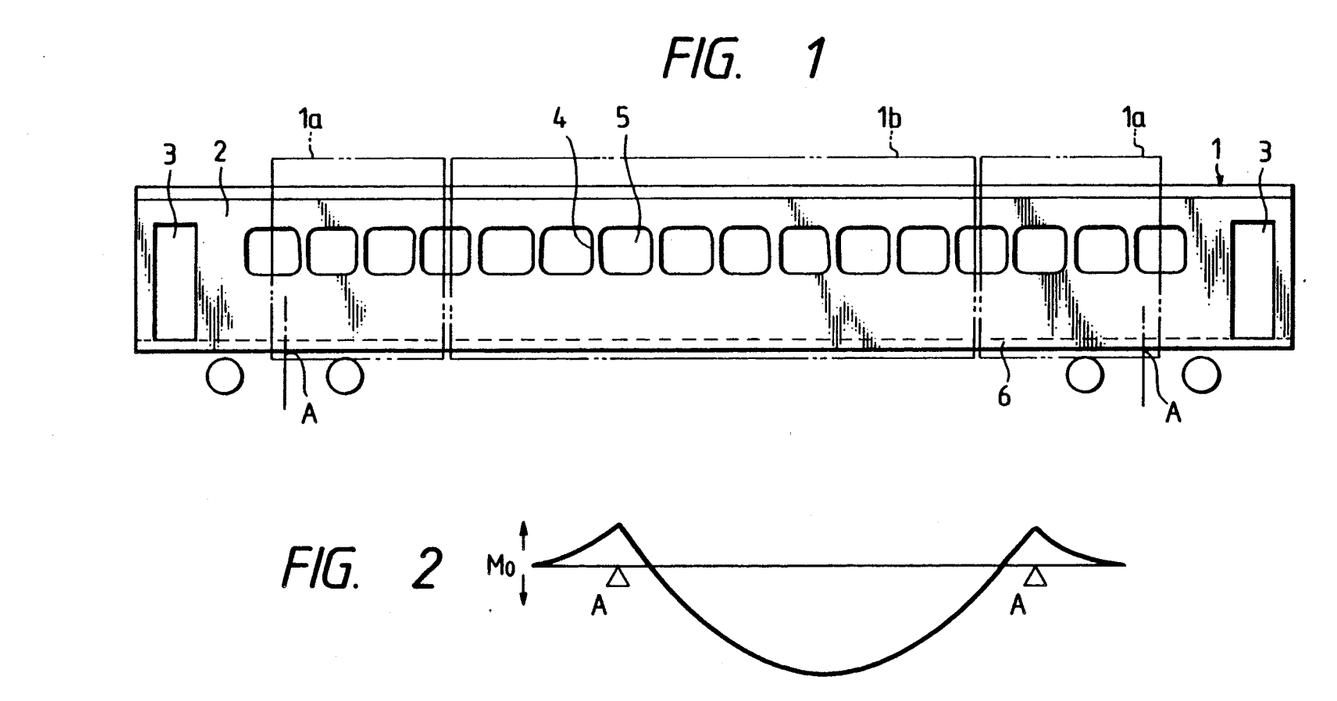
FIG. 1 is a side elevational view of a car body of a railway rolling stock.
FIG. 2 is a diagrammatic illustration of a distribution of a bending moment when a vertical load acts against a car body.

Referring now to the drawings wherein like reference numerals are used throughout the various views to designate like parts and, more particulary to FIG. 1, according to this figure, a car body 1 includes a side construction 2 constituting both side surfaces of the car body 1, with the side construction 2 being formed with openings 3 near the respective longitudinal ends thereof. A plurality of windows 5 are arranged between the openings 3 with the windows 5 being partitioned by a plurality of intermediate posts 4. The car body 1 further includes an underframe construction 6 constituting a bottom surface of the car body 1 with support for the car body 1 being provided by a truck (not shown) through body bolsters (not shown) arranged at positions A near longitudinal ends of the underframe 1. The body bolsters transmit a vertical load of the car body 1 to the truck and further transmit a vertical load of the car body 1 to the truck and further transmit either a drawing force or a braking action generated in the truck to the car body 1.

Figure 3:
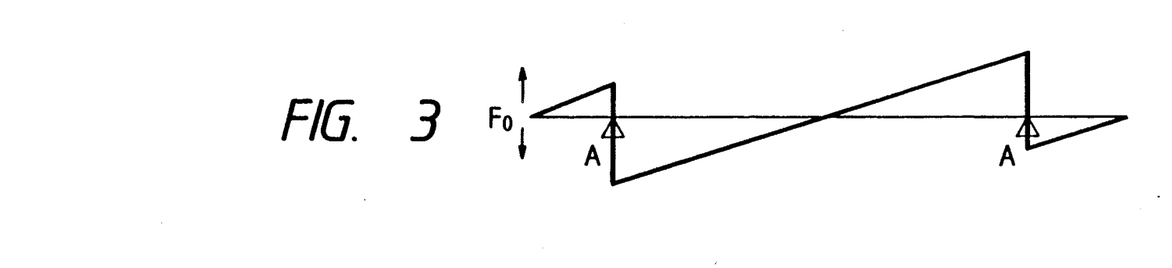
FIG. 3 is a diagrammatic illustration of a distribution of a shearing load wherein a vertical load acts against a car body.

In order to insure the bending moment M and the shearing load F, a distribution of which as shown in FIGS. 2 and 3, the car body 1 is constructed such that the shearing stiffness is made larger at a part 1a near the body bolster in the longitudinal direction of the car body then a central portion 1b, and the bending stiffness is made larger at the central portion 1b then the bending stiffness near a part 1a of the body bolster. When a vertical load acts on the car body 1, a deformation of a part 1a near the body bolster caused by the shearing load is restricted and, with this arrangement, an entire car body 1 may deform as one beam. That is, an amount of deformation at the central part 1b under a vertical load is reduce and a further bending stiffness of the entire car body 1 can be increased.

Figure 4:
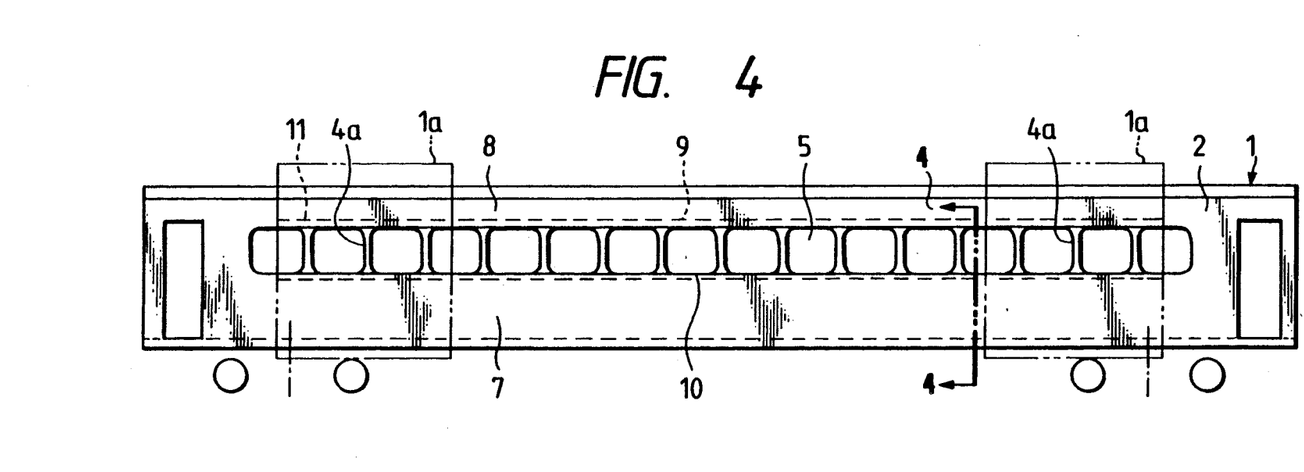
FIG. 4, is a side elevational view of an embodiment of a car body constructed in accordance with the present invention.
Figure 6:
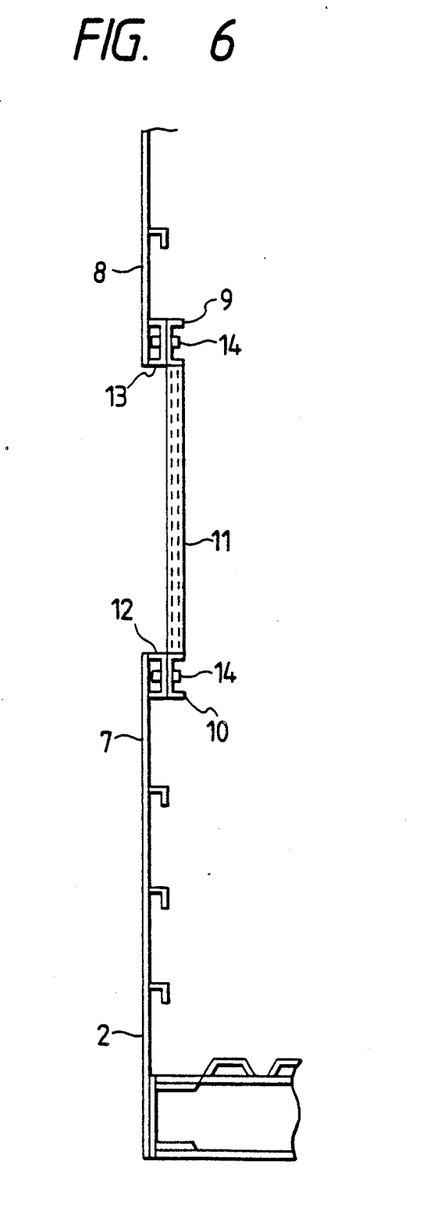
FIG. 6 is a cross-sectional view taken along the line VI—VI in FIG. 4.

As shown in FIGS. 4 and 6, a wainscot portion 7 forms a lower part of the windows 5, with a window head portion 8 forming an upper part of the windows 5 and with both the wainscot portion 7 and the window head portion 8 being formed of aluminum alloy members. Intermediate post frames 4a partition the windows 5 into several units, with intermediate post frames 4a being vertically arranged so as to connect the wainscot portion 7 with the window head portion 8. The vertically extending columns or posts are not arranged between the window head portion 8 and the wainscot portion 7.

Figure 5:
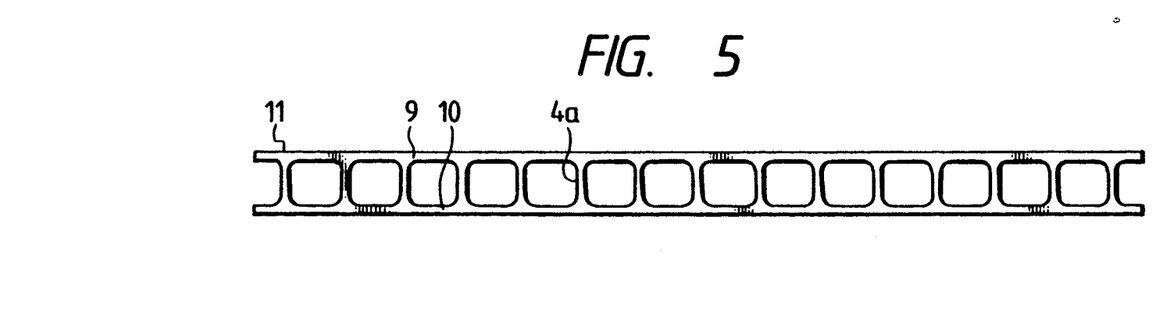
FIG. 5 is a front elevational view of an intermediate post frame of the car body of FIG. 4.

As shown most clearly in FIGS. 5 and 6, an upper frame 9 is fixed to the lower edge portion of the window head portion 8, with a lower frame 10 being fixed to an upper edge portion of the wainscot portion 7. The upper frame 9 and the lower frame 10 are connected though the intermediate post frames 4a so as to form a latter-type intermediate post member 11 made of high strength material such as, for example, stainless steel.

As shown in FIG. 6, a belt rail 12 is arranged on an upper edge part of the wainscot portion 7, and a window header 13 is arranged at the lower edge of the window head portion 8. A large continuous opening, extending in a longitudinal direction of the car body 1, is provided between the wainscot portion 7 and the window head portion 8, with the intermediate post member 11 being fixed in the opening by a method wherein the upper frame 9, is fixed to the window header 13 through blind rivets 14, and the lower frame 10 is fixed to the belt rail 12 through blind rivets 14. The windows 5 are formed by fixing the intermediate post means 11 to the side construction 2, and the blind rivets 14 are mounted in a longitudinal direction of the car body under an appropriate pitch. The blind rivets may be used together with bonding material and, in place of the blind rivets it is also possible to utilize bolts and nuts.

The upper frame 9 and the lower frame 10 can be made of clad steel in which the same type of material as that of wainscot portion 7 and the window head portion 8, i.e. aluminum alloy material, and the same type of material as that of the intermediate post frames 4a, i.e. stainless steel are connected by an explosion press fitting process or the like. With the upper frame 9 and the lower frame 10 being constructed of a clad steel material, the upper frame 9 and the window header 13 as well as the lower frame 10 and the belt rail 12 can be connected by a welding operation whereby a fixing operation of the intermediate post frame 4a to the side construction 2 can easily be performed.

With a construction such as described above, when a vertical load acts on the car body 1, the intermediate post member 11 may support the vertical load together with the car body 1 and, at this time a shearing load may act at the intermediate post frames 4a of the intermediate post member 11 of the part 1a near the body bolster. The intermediate post frames 4a exhibit secondary bending load that is generated by the shearing load. Accordingly, if the intermediate post member 11 is made with a sufficiently higher rigidity, it is possible to reduce any deformation generated under an action of the shearing load and the bending load against the car body 1. In turn, the lower frame 10 and the upper frame 9 of the intermediate post member 11 are directly connected to the belt rail 12 and the window header 13 of the side construction 2, and all these members integrally accommodate the vertical load and, in view of this fact, it is also possible to improve a rigidity of the unit so that the portion 1a near the body bolster of the side construction 2 exhibits an improved rigidity against the shearing force. With this arrangement, a bending stiffness of the entire car body 1 can be improved. In addition, the intermediate post frames 4a are formed of stainless steel, so that allowable stress of the intermediate frames 4a may be increased more than the allowable stress of other portions of the car body 1. As the allowable stress of the intermediate post frames 4a is increased, a reliability of strength of the car body 1 can be improved. In addition, a rate of increasing of the rigidity per unit weight of the car body 1 is increased, so that a light weight car body can be manufactured.

Figure 7:
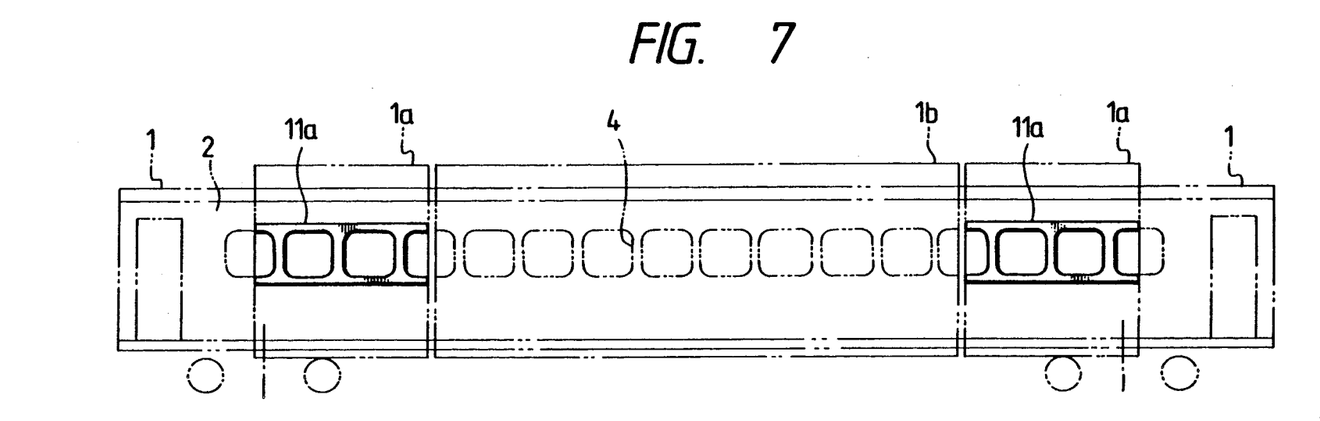
FIG. 7 is a side elevational view of another embodiment of a car body constructed in accordance with the present invention.

Referring to FIG. 7, intermediate post members 11a, having a length shorter than the intermediate post members described above, are mounted at the side construction 2 corresponding to the portion 1a near the body bolsters of the side construction 2. The intermediate post frame members 11a have a short length in a longitudinal direction of the car body 1, and the intermediate post frames 4, other than those where the intermediate post frame members 11a are, are constructed in the same manner as that of the prior art car body. That is, the side posts are arranged in a vertical direction from the window head portion 8 to the wainscot portion 7 and the side posts constitute the intermediate post frames 4. The intermediate post members 11a are fixed to the window head portions and the wainscot portion of the side construction 2 with the blind rivets in the same manner as the first embodiment described hereinabove.

With an arrangement as described above, when a vertical load acts against the car body 1, the portion 1a near the body bolster exhibits the same characteristics as that of the embodiment of FIGS. 4–6. In this case, since the central part 1b of the car body 1 is made of the same aluminum alloy as that of the other portions, the deformation of the central part 1b is easily generated as compared with the portion 1a near the body bolster. However, at the central part 1b of the car body 1, the shearing load is low as shown in FIG. 3, and no problem may occur even if the stiffness of the intermediate post frames 4 is low. Thus, an arrangement in which the intermediate post members 11a are arranged at the portion 1a near the body bolster enables a shearing stiffness of the portion 1a near the body bolster to be improved. Additionally, with the intermediate post members 11a are made shorter than in the embodiment of FIGS. 4–6, the entire car body 1 can be of a light weight construction.

Figure 8:
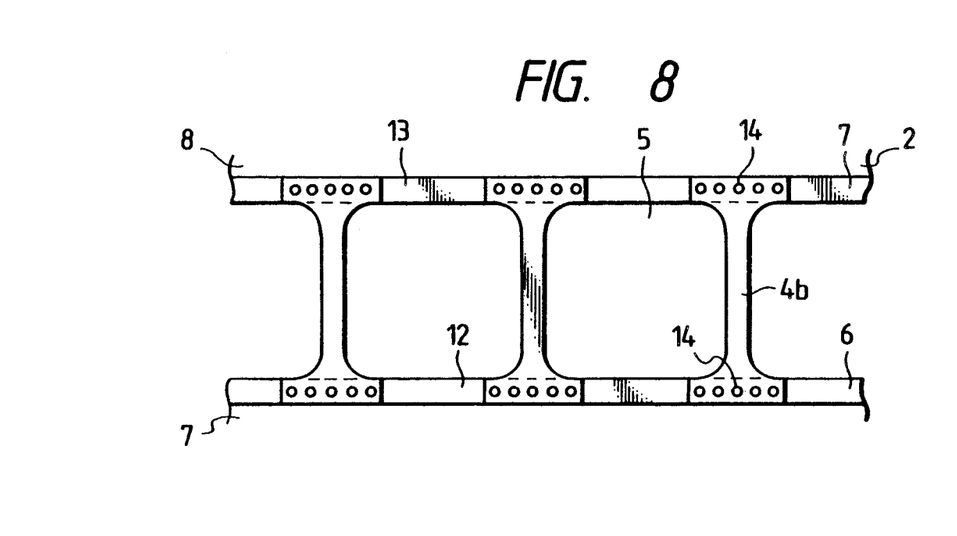
FIG. 8 is a side elevational view, on an enlarged scale, of a window frame of yet another embodiment of a car body constructed in accordance with the present invention.

As shown in FIG. 8, a plurality of intermediate post frames 4b are made as a single unit in place of the intermediate post members of the embodiment of FIGS. 4–7, with the intermediate post frames 4b being made of high rigidity material such as, for example, a stainless steel, and fixed in an interval coinciding with a width of each of the windows 5. The intermediate post frames 4b have a substantially I-shape cross-sectional configuration and at upper and lower ends thereof, are fixed to the belt rail 12 and the window header 13 with blind rivets 14 with the belt rail 12 and the window header 13 being respectively connected to the wainscot portion 7 and the window header portion 8.

In this manner, the intermediate post frames 4b are fixed to the side construction 2, thereby improving a rigidity of the side construction 2 and, with an improved rigidity of the side construction 2 the rigidity of the car body 1 can be improved. Since the intermediate post frames 4b are made as a single unit, mass production techniques can be employed thereby improving productivity. Since the intermediate post frames 4b are connected at upper and lower ends connected to the window head portion 8 and the wainscot portion 7, it is not necessary to use the upper frame 9 and the lower frame 10 as described hereinabove in connection with the embodiments of FIGS. 4–7 and, with this arrangement, a the entire car body 1 has a light weight.

Figure 9:
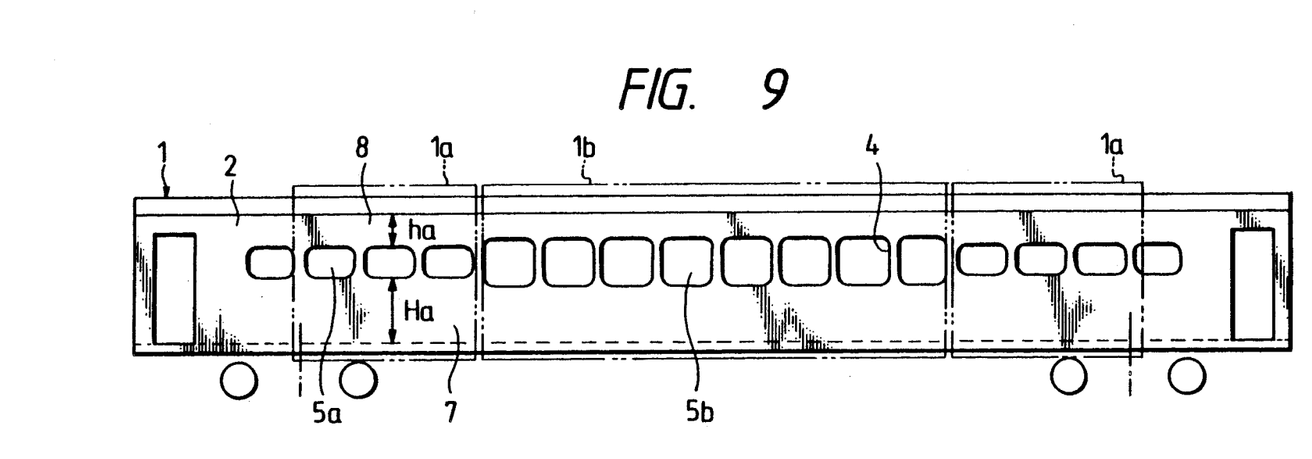
FIG. 9 is a side elevational view of a further embodiment of a car body constructed in accordance with the present invention.

Referring to FIG. 9, windows 5a, having a vertical size of an opening portion shorter than an opening portion of the window 5b at the central part 1b of the side construction 2 are formed near the portion 1a of the body bolster. At an installing position of each of the windows 5a, a vertical size Ha of the wainscot portion 7 and a vertical size ha of the window head portion 8 is shorter than a vertical size of the wainscot portion 7 and the window head portion 8 at the central portion 1b. With this arrangement, at the portion 1a near the body bolster at the side construction 2, a rate of area of the opening in the outside plate is reduced. Accordingly, at the portion 1a near the body bolster of the side construction 2, a stress is reduced with respect to the shearing load and then a rigidity of the unit can be improved. With this arrangement, a deformation of the car body 1 with respect to the shearing load at the portion 1a near the body bolster is reduced and an entire bending rigidity can be improved.

If all the members constituting the side construction 2 are of the same type of material, the number of manufacturing steps can be reduced as compared with that of mounting different types of materials. In addition, as compared to a case in which a separate member having a relative heavy weight with a high rigidity is provided, the above described constructions are effective in reducing a weight of the car body 1.

Figure 10:
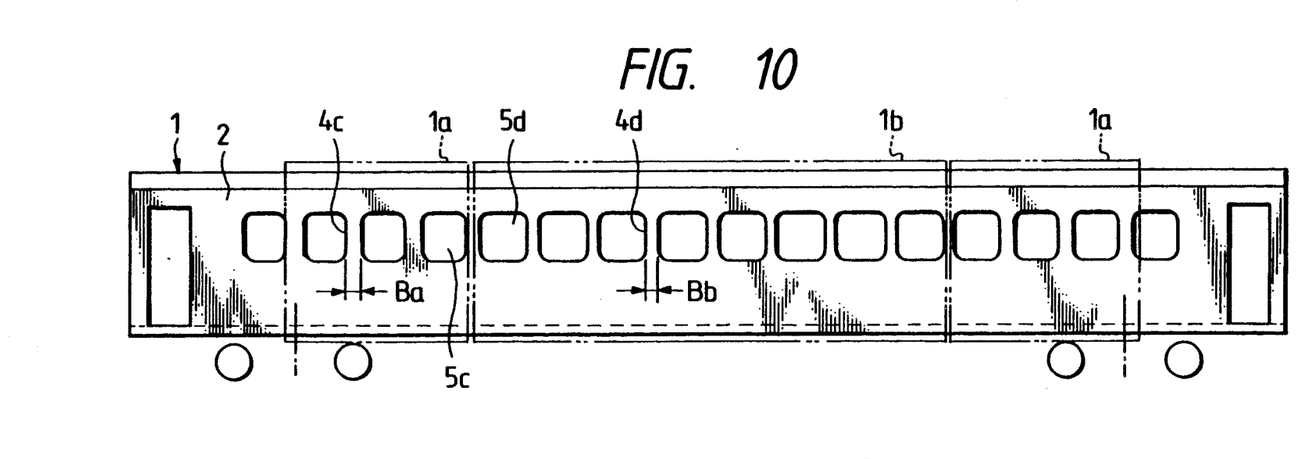
FIG. 10 is a side elevational view of a still further embodiment of a car body constructed in accordance with the present invention.

Referring to FIG. 10, a car body 1 is provided wherein all the sizes of the vertical portions of the windows are the same and a width of the intermediate post and window differ from each other. More particularly, an intermediate post frame 4c at the portion 1a near the body bolster has horizontal size or width Ba which is wider than a width Bb of the intermediate post frames 4d at the central part 1b of the car body. A difference of a width size between the intermediate post frame 4c and the intermediate post frame 4d is equal to a difference in width size between the window 5c and the window 5d. Accordingly, the window 5c is shorter than a width size by a difference between the intermediate post frame 4c, and the intermediate post frame 4c than a width size of the window 5d.

According to the present invention, since an area of the opening part of the portion 1a near the body bolster of the side construction 2 is reduced in the same manner as that of the embodiment of FIG. 9, a rigidity of the portion 1a near the body bolster at the side construction 2 can be improved. The intermediate post frame 4c can reduce a bending deformation at a secondary location generated by a shearing deformation.

Accordingly, the structure of FIG. 10 can improve a rigidity of the car body 1 and further provide a light weight of the car body 1. This is effective in view of the reduction of labor and manufacturing time in manufacturing the car body 1.

Figure 11:
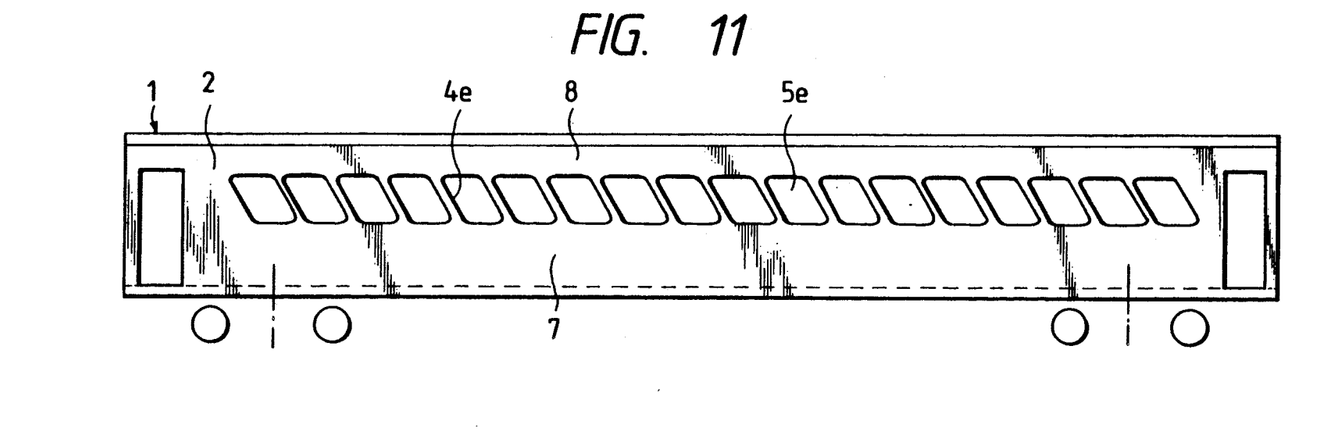
FIG. 11 is a side elevational view of another embodiment of a car body constructed in accordance with the present invention.

Referring to FIG. 11, a car body 1 is provided wherein an inclined intermediate post frame is provided. More particularly, intermediate post frame 4e for forming windows 5e are inclined by a certain degree with respect to a vertical axis. The side posts mounted in a vertical direction through the window head portion 8 and the wainscot portion 7 at their inside part are vertically arranged in an extended direction of the intermediate post frames 4e or from either an upper end or lower end of each of the intermediate post frames 4e.

In accordance with the construction of the FIG. 11, the intermediate post frames 4e are inclined, so that the longitudinal direction of the intermediate post frames 4e, with respect to the directions of the shearing deformation of the side construction 2 are crossed with respect to each other or disposed in parallel to each other. Accordingly, the intermediate post frames 4e support a shearing force acting against the side construction 2 as an axial force of the intermediate post frames 4c. Due to this fact, the deformation in respect to the shearing load of the intermediate post frames 4e is reduced. In this manner, the installation to be inclined of the intermediate post frames 4e enables a rigidity of the side construction 2 or the entire car body 1 to be improved.

Figure 12:
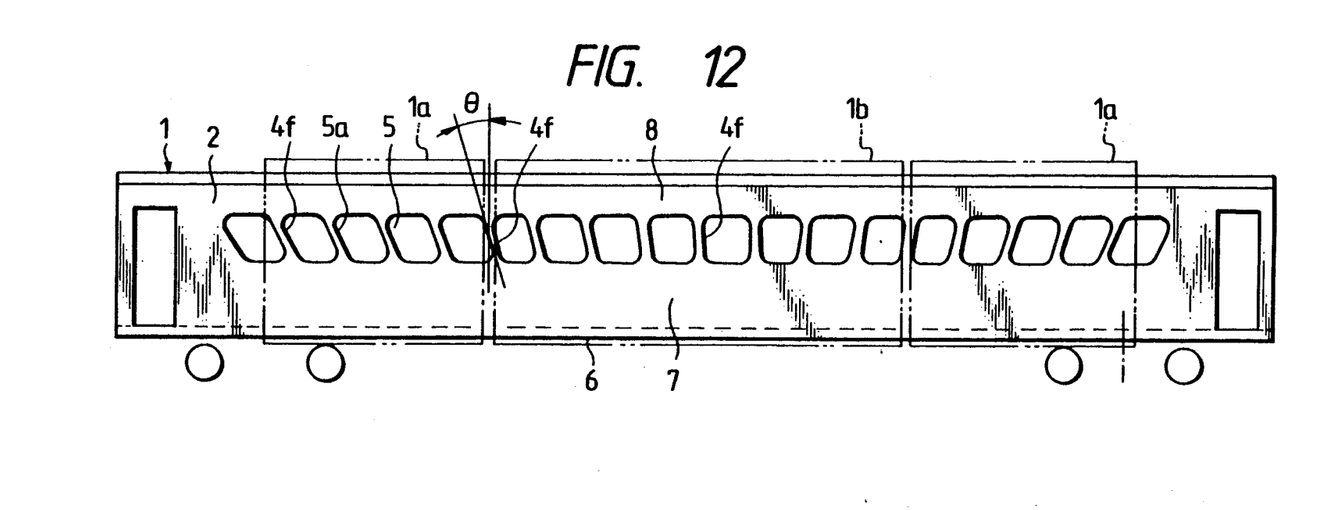
FIG. 12 is a side elevational view of yet another embodiment of a car body constructed in accordance with the present invention.

Referring to FIG. 12, a car body 1 is provided wherein the intermediate post frames are inclined, with the direction of inclination of each of the intermediate post frames being opposite to each other in one car body. More particularly, intermediate post frames 4f are inclined at an upper end toward the end of the car body with an inclination angle Θ of the intermediate post frames 4f having a higher value at the portion 1a near the body bolster than at the central portion 1b of the car body 1. The inclination angle Θ of the intermediate post frames 4f gradually increases from the longitudinal central part of the car body 1 toward the end of the car body 1.

According to the construction of FIG. 12, the inclination angle of the intermediate post frames 4f approaches mostly toward a direction of the shearing deformation at the portion 1a near the body bolster. Thus, since the shearing load becomes a tensile axial force in the intermediate post frames 4f, the buckling strength can be improved. Further, since the central portion 1b of the car body 1 has a low inclination angle of the intermediate post frames 4f, the vertical load acting against the underframe 6 can be transmitted as an axial force in a tension direction from the wainscot portion 7 toward the window head portion 8. In this manner, since the load acting against the intermediate post frames 4f can be transmitted as an axial force in a tension direction, an effective load accommodating structure is obtained.

Figure 13:
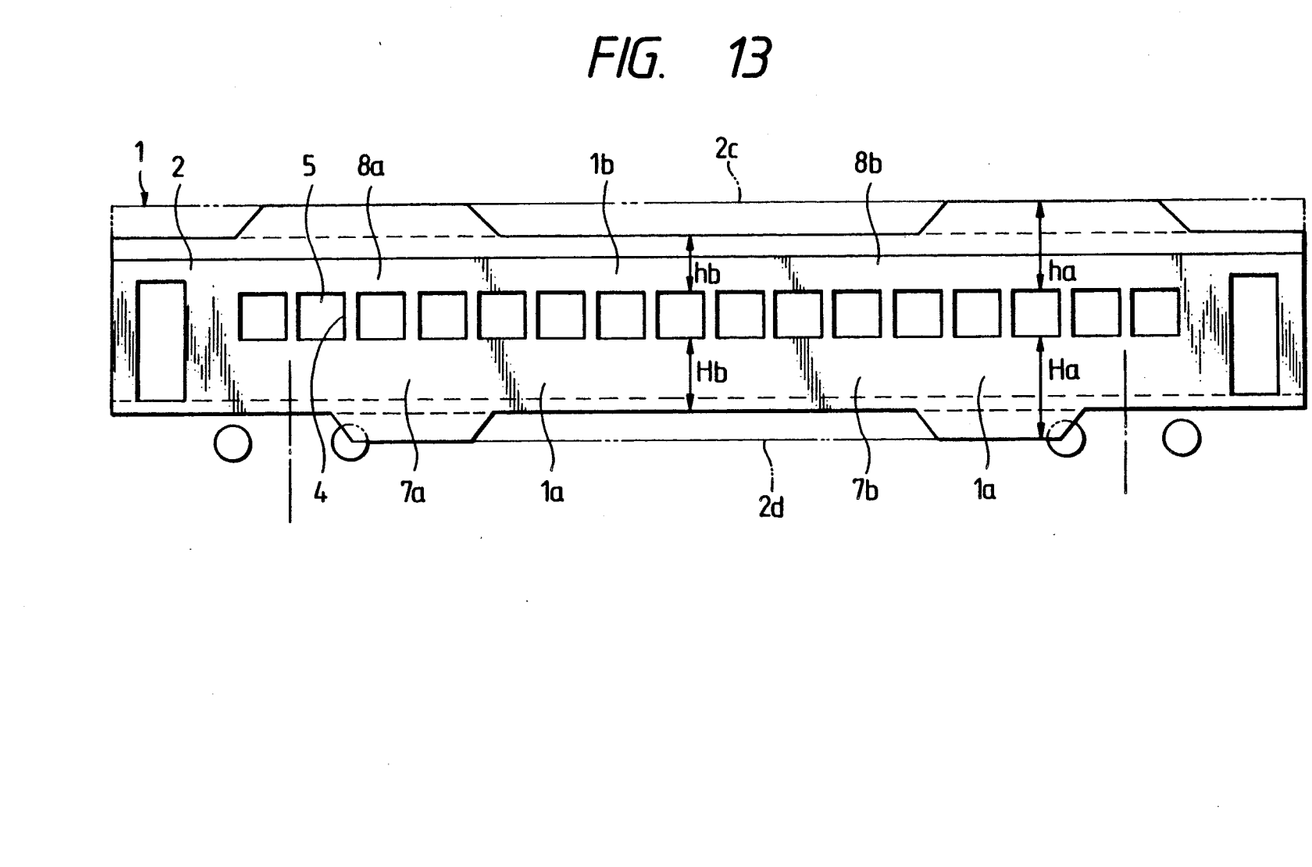
FIG. 13 is a side elevational view of a further embodiment of a car body constructed in accordance with the present invention.

Referring to FIG. 13, a car body 1 is provided wherein an area of the outside plate portion is increased without changing an apparent shape of the side construction 2. A wainscot portion 7a, at the portion 1a near the body bolster 1, is constructed such that the outside plate and the upper or lower frame are projected more downwardly than the wainscot portion 7b of the central part 1b of the car body 1. The wainscot portion 7a occupies a large area of the outside plate and, accordingly, a height size Ha of the wainscot portion 7a is longer than the height size Hb of the wainscot portion 7b. With this arrangement, the lower side of the side construction 2 is partially projected and a cover 2d is provided for enabling an attainment of a straight shape of the side construction 2. The window head portion 8a, at the portion 1a near the body bolster 1, is constructed such that the outside plate and the frames are projected more upwardly than the window head portion 8b of the central part 1b of the car body The window head portion 8a is constructed such that its outside plate portion thereof has an enlarged area and, accordingly, a height size ha of the window head portion 8a is longer than the height size hb of the window head portion 8b. With this arrangement, an upper side of the side construction 2 is partially projected, with the cover 2c being arranged at a concave part so as to provide for a straight shape.

According to the construction of FIG. 13, since the area of the outside plate portion of the side construction 2 at the portion 1a near the body bolster can be enlarged, a rigidity of this portion can be improved and an amount of deformation caused by a shearing load can be reduced.

With regard to the covers 2c and 2d, if the covers 2c, 2d are constructed of a complex resin material, the weight of the car body 1 can be reduced to a minimized.

Figure 14:
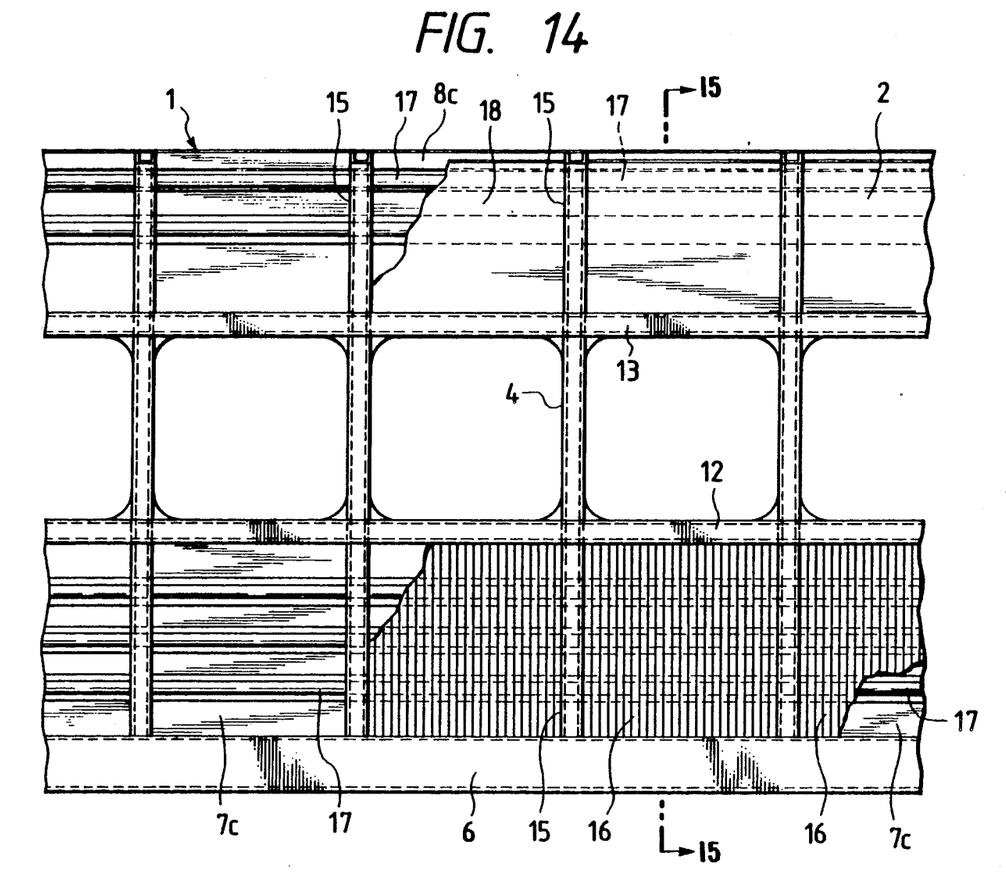
FIG. 14 is a front elevational view of an inner surface of a side construction of a car body constructed in accordance with a still further embodiment of the present invention.
Figure 15:
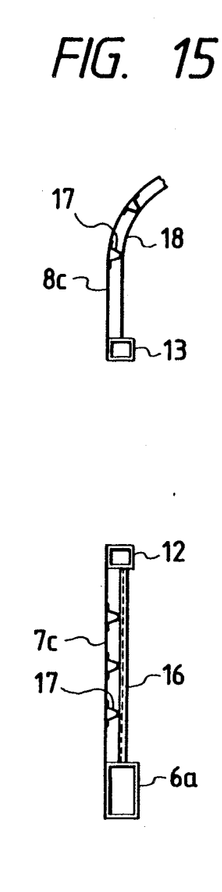
FIG. 15 is a cross-sectional view taken along the line XV—XV in FIG. 14.

Referring to FIGS. 14 and 15, a car body 1 is provided wherein a reinforcement member is mounted at an inner surface of the outside plate with respect to the portion 1a near the body bolster of the side construction 2. More particulary, a vertical rib 17 is connected to an inner surface of the outside plate constituting a wainscot portion 7c located at the portion 1a near the body bolster. A corrugated plate 16 is formed with vertical grooves therein is connected by arc welding to an inner side of the vertical rib 17. A side post 15 is integrally formed with the intermediate post frame 4, a window head portion 8c is provided at the portion 1a near the body bolster. The vertical rib 17 is connected to the inner surface of the outside plate constituting the window head portion 8c, and a flat plate 18 is connected to the inner side of the vertical rib 17 by an arc spot welding process.

According to the construction of FIGS. 14 and 15, the rigidity the wainscot portion 7c and window head portion 8c is enforced by the vertical rib 17, corrugated plate 16 and flat plate 18. With this arrangement, it is possible to improve a rigidity of the portion 1a near the body bolster of the side construction 2 and a deformation of the side construction 2 in case of a shearing load can be restricted to be as small as possible. Additionally, the reinforcement member of the corrugated plate 16 and the flat plate 18 is arranged only at the portion la near the body bolster, to thereby provide a light weight of the car body 1 and an attainment of an effective improvement of the strength of the car body 1.

The corrugated plate 16 may be fashioned as a flat plate or a rod-like reinforcing member, and a rivet bonding having blind rivets and bonding material may be utilized.

In each of the embodiments described above, the outside plate is described as having a uniform plate thickness; however, it is also possible to utilize an outside plate having a thickened area at a portion near the body bolster may be uniformly formed one or a combination of different plate thicknesses. With these measures, a rigidity of the side construction can be improved.

The shearing rigidity of the portion near the body bolster of a car body in respect to vertical load can be also improved by other construction. For example, that is can be attained by increasing the vertical size of side sills near the body bolster forming an underframe. With this arrangement, a cross sectional area of the portion which supports vertical load is increased and shearing rigidity of the portion near the body bolster of a car body can be improved. In addition, improving the shearing rigidity of upper portions of side construction near the body bolster is similarly effective.

According to the present invention, it is possible to provide such a construction in which a shearing load acting against the car body may be effectively supported under an improved strength of the portion near the body bolster a rigidity of the car body can be improved thereby making it possible to manufacture a light weight car body of railway rolling stock.

We claim:

1. A car body for railway rolling stock, the car body comprising a roof means for forming a roof of the car body, a side means for forming respective sides of the car body, end means for forming respective ends of the car body, an underframe means for forming a bottom of the car body, and body bolster means provided on said underframe means and supported by truck means, wherein a shearing rigidity with respect to a vertical load is maximum in a portion of the car body near the body bolster means but slightly displaced in a longitudinal direction of the car body toward a central part of the car body.

2. A car body of railway rolling stock according to claim 1, wherein a portion near the body bolster means of the side means is constructed such that a shearing rigidity with respect to a vertical load is larger than a shearing rigidity of a portion other than the portion near said body bolster means.

3. A car body for railway rolling stock according to claim 1, further comprising a plurality of window opening means provided in said side construction means, at least one window opening means at a portion ear the body bolster means is smaller than a window opening means provided in the side construction means at a portion of the car body other than the portion of the car body near said body bolster means.

4. A car body for railway rolling stock according to claim 1, further comprising a plurality of window opening means provided in said side construction means, wherein said side construction means includes a plurality of intermediate post frame means located between adjacent window opening means of said plurality of window opening means, wherein a width of at least one of the intermediate post frame means at the portion of the car body near the body bolster means is larger than a width of the intermediate post frame means located at portions other than the portion near said body bolster means.

5. A car body for railway rolling stock according to claim 1, further comprising a plurality of window opening means provided in said side construction means, wherein said side construction means includes a plurality of intermediate post frame means located between adjacent window openings of said plurality of window opening means and inclined with respect to a vertical axis.

6. A car body of for railway rolling stock according to claim 5, wherein an inclination angle of the intermediate post frame means with respect to a vertical axis increases in value as it approaches from a central part of the car body toward the portion of the car body near the body bolster means.

7. A car body for railway rolling stock according to claim 6, wherein said intermediate post frame means are arranged in such a manner than an upper end of the respective intermediate post frame means is inclined toward one end of the car body to which the respective intermediate post frame means are nearer than to the other end of the car body.

8. A car body for railway rolling stock according to claim 7, wherein the inclination angle of said intermediate post frame means has a maximum value at a portion near the body bolster means and the inclination angle decreases to a lower value toward a central portion of the car body.

9. A car body for railway rolling stock, the car body comprising a roof means for forming a roof of the car body, side means for forming respective side of the car body, end means for forming respective end of the car body, an underframe means for forming a bottom portion of the car body, and body bolster means provided on said underframe means and supported by truck frame means, said side means including a plurality of intermediate post frame means, and wherein at least one intermediate post frame means a supporting point of the side construction means is made of a material having a higher rigidity than that of a material forming a portion of the car body other than said intermediate post frame means.

10. A car body for railway rolling stock according to claim 9, wherein the at least one intermediate post frame means at a portion of the car body near the body bolster means are of a different material having a high rigidity than a rigidity of material forming a portion of the car body other than said at least one intermediate post frame means combined with it.

11. A car body for railway rolling stock, the car body comprising a roof means for forming a roof of the car body, side means for forming respective sides of the car body, end means for forming respective ends of the car body, and underframe means for forming a bottom portion of the car body, and body bolster means provided on said under frame means and supported by tuck means wherein a plate thickness of an outside plate of a portion of the car body near the body bolster means of the side means is thicker that a thickness of an outside plate other than the portion of the car body near the body bolster means.

12. A car body for railway rolling stock according to claim 11, wherein said plate thickness of said outside plate is continuously varied.

13. A car body comprising a roof means for forming a roof of the car body, side means for forming respective sides of the car body, end means of forming respective ends of the car body, an underframe means for forming a bottom portion of the car body and body bolster means provided on said underframe means and supported by truck means, wherein an outside plate of a portion of the car body near the body bolster means has a larger vertical size than a vertical size of an outside plate other than a portion near the body bolster means.

* * * * *